Patented Mar. 3, 1942

2,275,176

UNITED STATES PATENT OFFICE 2,275,176

CRACKING OIL WITH SYNTHETIC CATALYTIC COMPOSITIONS

Gerald C. Connolly, Baton Rouge, La., assignor to Standard Oil Development Company, a corporation of Delaware No Drawing. Application December 6, 1938, Serial No. 244,181

2 Claims. (Cl. 196—52)

This invention deals with the use of superior activated synthetic gel catalysts and especially to the use of such catalysts for the catalytic cracking of hydrocarbons such as those occurring in petroleum. More particularly, this invention relates to the use of certain elements of group IV of the periodic table, for improving the catalytic cracking activity of various synthetic gel catalytic masses.

Certain metal compounds such as silica and alumina have the property of existing in the hydrogel form, which, upon drying, yields a very porous mass (dried gel), of high catalytic activity. These hydrogels are generally prepared by allowing a hydrosol to "set" until a considerable portion of the reaction liquid is imbibed by some sort of colloidal structural arrangement. Two different hydrogels may be intimately mixed to obtain a mechanical mixture (mixed gel), which upon drying, may have superior properties over either one of the individual constituents. Plural hydrogels are obtained by allowing a mixed hydrosol of different metal compounds to "set." Impregnated gels may be prepared by soaking washed hydrogels in different salt solutions so that the latter are completely dispersed throughout the mass. Gelatinous precipitates differ from hydrogels by the fact that they separate from the liquor as a slimy fluid jelly in a separate phase leaving some supernatant liquid above. A heterogeneous gel, on the other hand, is a gelatinous precipitate dispersed in a hydrosol and allowed to "set" or "gel."

For the purposes of this invention, the term "hydrous oxide jelly" will be employed to designate all gels other than those in the dried form which no longer possess the flexible characteristics attributable to gels containing appreciable amounts of imbibed water.

For example, a hydrosol of silica may be prepared by mixing equal volumes of 25° Bé. sodium silicate solution and 23° Bé. sulfuric acid solution. In 3–5 hours, the hydrosol sets to a silica hydrogel, imbibing all of the reaction liquids. The hydrogel may be broken up, washed free of reaction salts, formed if desired and dried. Hydrous alumina hydrogel may be prepared by mixing with stirring, a solution of 10 kg. of $Al_2(SO_4)_3.18H_2O$ dissolved in 100 liters of water with 100 liters of $1N NH_4OH$, and washing by decantation with distilled water. A mechanical mixture of the two hydrogels is obtained by intimate mixing of the two washed hydrogels.

Plural hydrogels of silica and alumina in the ratio of 12:1 may be prepared by adding a volume of 23° Bé. sulfuric acid solution containing aluminum sulfate equivalent to one mole of $Al_2O_3$, to an equal volume of 25° Bé. sodium silicate solution. After the hydrogel has set, it is washed with distilled water.

Impregnated gels having molal ratios of about $12SiO_2:1Al_2O_3$ are prepared by soaking washed silica hydrogel overnight in a 30% solution of $Al(NO_3)_3.9H_2O$, draining, drying, and decomposing the aluminum nitrate by heat. These dried products of hydrogel which no longer retain their spongy characteristics are known as dried gels.

The present invention is specifically concerned with the use of dried gel catalysts containing small amounts of the heavy elements of group IV, the stable oxides of which melt above 1000° C., and the atomic weights of which range between the approximate limits of 90–233. Since regeneration of these catalysts is carried out at high temperatures, it is essential that the oxides be substantially infusible under such conditions. Furthermore, it has been found that elements in this group having atomic weights below 90, such as titanium, show detrimental effects even in small concentrations, as evidenced by low yields of gasoline obtained during the cracking operations. The elements with which this invention deals are specifically zirconium, tin and thorium, and they are preferably added in the form of their water soluble salts to the gel catalysts. They may be incorporated in the hydrosol or heterogeneous gel stages, or employed as mixed hydrous gels or used for impregnating the hydrous or dried gels. The amount of these elements added to these catalysts is very small, preferably not over about 0.5% to 1% or 1.5%, since it has been found that higher amounts detrimentally affect the activity of the gel catalysts. Although silica-alumina gels are preferred as base stocks, the invention is not limited to this material but is applicable to other hydrous oxide gels possessing some catalytic activity.

In the preferred procedure, it is desirable to employ co-impregnated silica hydrogels obtained by soaking the purified silica hydrogel produced in known manner in a mixed solution of a soluble aluminum salt such as aluminum nitrate, and a soluble salt (usually the ammonium salt or the nitrate) of the metal promoter desired. The resulting product is drained, dried, decomposed by heating, and ground or formed, if desired.

It has been found that although alumina-silica gels are fairly active catalysts for cracking reactions, their cracking activity can be appreciably improved by the addition of small amounts of these promoters, which comprise salts of zirconium, tin or thorium, or mixtures thereof.

The invention can be more clearly understood by reference to the following examples, which, however, are not intended to limit the invention in any respect:

*Example 1.*—A purified silica hydrogel was prepared and impregnated with aluminum nitrate so that the dried gel produced contained about 12.5% of alumina. This gel had a density of 0.600 and was employed for the cracking of West Texas gas oil of 33.8 A. P. I. gravity for a period of 2 hours at a temperature of 855° F., and a feed rate of 0.615 vol./vol./hr. The amount of gasoline obtained was 50% by volume. The liquid product had an A. P. I. gravity of 46.9 and the rejected gas obtained amounted to 11.6 liters per hundred grams of liquid product, the gas density being 0.98.

*Example 2.*—The same silica hydrogel as that described in Example 1 was impregnated with a mixture of aluminum nitrate and zirconium nitrate so that the resulting dried gel contained about 12.5% $Al_2O_3$ and 0.1% $ZrO_2$. The apparent density of the catalyst was 0.575. Upon cracking of the West Texas gas oil under conditions given in Example 1, a gasoline yield of 51% was obtained, and the rejected gas amounted to 9.6 liters per hundred grams of liquid product, showing that the small amount of the zirconium increased somewhat the activity of the cracking catalyst and decreased the gas formation to some extent.

*Example 3.*—A catalyst was prepared as in Example 2, except that 1.5% of $ZrO_2$ was present instead of 0.1%. The catalyst's apparent density in this case was 0.583. With this catalyst the gasoline yield obtained was 51.5%, showing a somewhat greater increase in activity by the further addition of the zirconium promoter.

*Example 4.*—A co-impregnated silica hydrogel was prepared as in Example 2, except that a tin salt was employed instead of the zirconium salt. The catalyst contained 12.5% $Al_2O_3$ and 0.1% $SnO_2$, and its apparent density was 0.629. Upon cracking of the gas oil as in Example 1, the gasoline yield obtained was 54.5% and the amount of rejected gas was 9.7 liters per hundred grams of liquid product, showing a decided improvement in activity over the unpromoted catalyst given in Example 1.

*Example 5.*—This catalyst was prepared as in Example 4, except that the $SnO_2$ content was 1.5% instead of 0.1%. The gasoline yield in this case was 45.5% and the rejected gas amounted to 14.1 liters per hundred grams of liquid product, showing a decided drop in activity upon further addition of the tin promoter.

*Example 6.*—The catalyst for this experiment was prepared as in Example 4, except that in this case the $SnO_2$ content was 5.0%. With this catalyst the gasoline yield was 36.5% and the amount of rejected gas was 17 liters per hundred grams of liquid product, showing a much further drop in activity with further addition of the tin promoter.

*Example 7.*—In this case a catalyst was prepared as in Example 2, except that the promoter was thorium, and the catalyst contained 0.1% $ThO_2$ besides the silica and alumina. When employed for the cracking operation as in Example 1, the gasoline yield obtained with this catalyst was 56.5%, and the amount of rejected gas was 9.4 liters per hundred grams of liquid product, showing a decided increase in yield over that obtained with the unpromoted catalyst described in Example 1.

*Example 8.*—Here the catalyst was prepared in the same manner as in Example 7, with the exception that the $ThO_2$ content was 1.5%. In this case the gasoline yield was 53%, showing a drop in activity when compared to the catalyst containing a lower amount of promoter as in Example 7.

*Example 9.*—The catalyst for this experiment was also prepared according to Example 7, except that the $ThO_2$ content was 5.0%. With this catalyst the gasoline yield was 50%, showing no better activity than the original unpromoted catalyst.

Although these catalysts operate most satisfactorily when employed for cracking operations, especially in the cracking of petroleum hydrocarbons, they may be advantageously employed for catalyzing other reactions such as dehydrogenation, alkylation, isomerization, aromatization, polymerization and the like.

Various modifications may be made within the scope of the present disclosure, and the invention is not limited to any particular examples or theory of operation, but only by the following claims in which it is intended to cover the invention as broadly as the prior art permits.

I claim:

1. A method of cracking hydrocarbon oils which comprises subjecting said oil while at cracking temperature to the action of a synthetic silica-alumina gel catalyst containing a major portion of silica and a minor portion of alumina and a small amount but not more than about 1% of tin oxide and keeping said oil in contact with said catalyst for a period sufficient to obtain a substantial amount of cracking.

2. The method defined in claim 1, wherein the amount of tin oxide is about 0.1%.

GERALD C. CONNOLLY.